No. 778,013. PATENTED DEC. 20, 1904.
E. J. CORSER.
FERTILIZER DISTRIBUTER.
APPLICATION FILED SEPT. 6, 1904.
NO MODEL. 2 SHEETS—SHEET 1.

Witnesses:
Inventor
Edson J. Corser
By E. W. Burgess
Attorney.

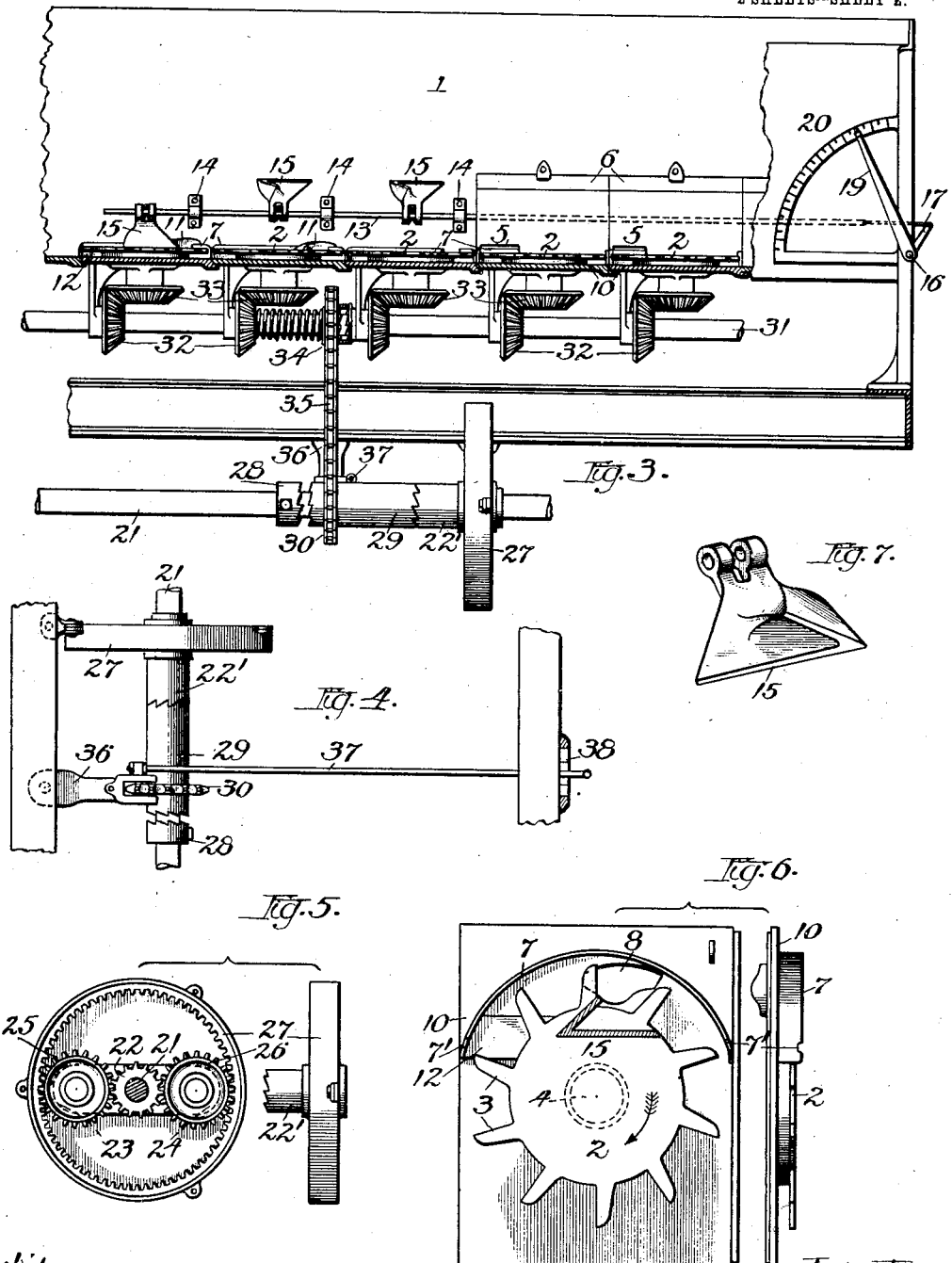

No. 778,013. Patented December 20, 1904.

UNITED STATES PATENT OFFICE.

EDSON J. CORSER, OF MACEDON, NEW YORK, ASSIGNOR TO INTERNATIONAL HARVESTER COMPANY, OF CHICAGO, ILLINOIS, A CORPORATION OF NEW JERSEY.

FERTILIZER-DISTRIBUTER.

SPECIFICATION forming part of Letters Patent No. 778,013, dated December 20, 1904.

Application filed September 6, 1904. Serial No. 223,330.

*To all whom it may concern:*

Be it known that I, EDSON J. CORSER, a citizen of the United States, residing at Macedon, in the county of Wayne and State of New York, have invented certain new and useful Improvements in Fertilizer-Distributers, of which the following is a specification, reference being had to the accompanying drawings, forming a part thereof.

My invention relates to fertilizer-distributers, and it is represented as being attached to and forming part of a common form of grain-drill, and it is designed to be used either singly or in combination with any of the various types in that class.

The object of the invention is to provide means for distributing fertilizing material in suitable quantities and in a positive manner, improved means for varying the amount distributed by regulating the size of the discharge-opening, and also to vary the amount by changing the speed of the distributing devices.

The invention consists in the construction and combination of parts now to be described.

Figure 1:
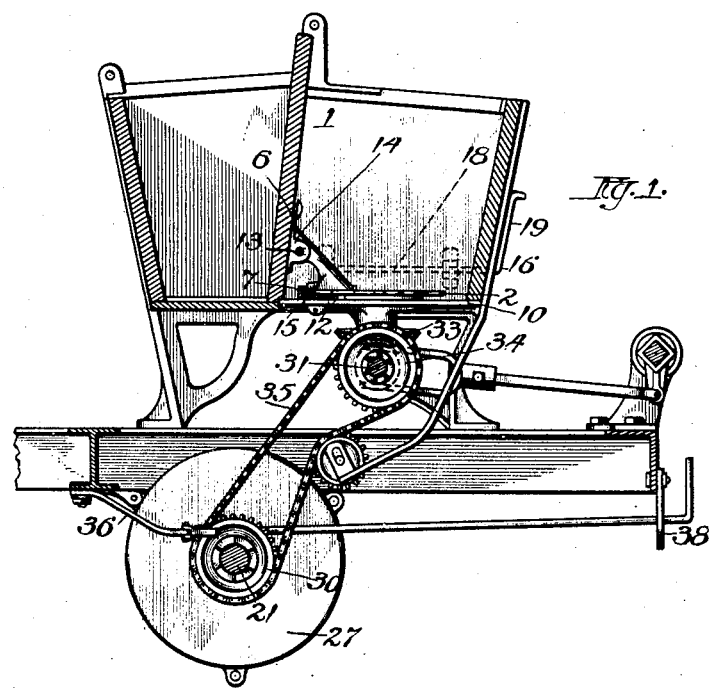
Figure 2:
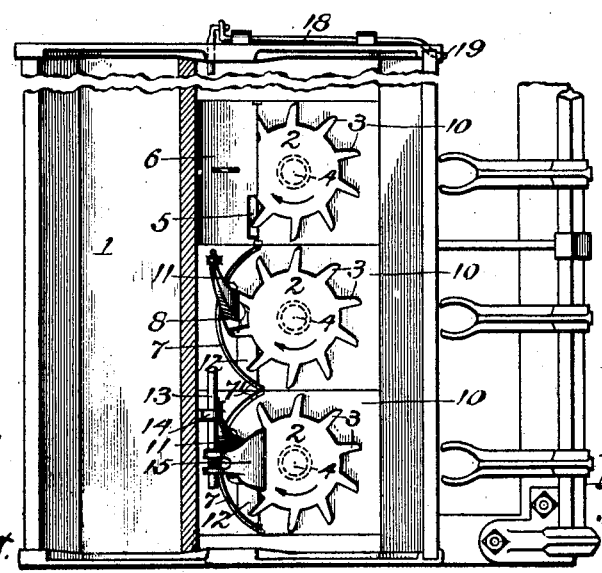

Referring to the drawings, wherein the same parts are designated by the same characters of reference throughout the several views, Figure 1 is a sectional elevation of a combined grain and fertilizer hopper having a fertilizer-distributer located therein. Fig. 2 is a top plan view of a part of Fig. 1. Fig. 3 is a rear elevation showing the manner of driving the distributers. Fig. 4 is a detail of the shipper mechanism. Fig. 5 is a detail of the change-speed mechanism. Fig. 6 is a detail of parts of the distributer mechanism, and Fig. 7 is a detached view of one of the sliding gates.

The hopper 1 may be of the ordinary or any suitable construction and may be provided with a series of fertilizer-distributers. These fertilizer wheels or disks are of the general class shown and described in the United States Patent to S. H. Everett, No. 476,637, dated July 26, 1892, on which this part of my invention is an improvement.

The fertilizer-wheels 2 are provided with a series of teeth 3 and spindles or bosses 4, which are suitably actuated in such manner that the wheels 2 are rotated in the direction indicated by the arrows in Figs. 2 and 6, and the fertilizer in contact therewith is conveyed and carried through the opening 5 in the back plate 6 between the said back plate and the semicircular rib 7 and is permitted to pass through the orifice 8 in the bottom plate 10 to the further distributing devices, the bottom plates forming the bottom of the hopper. The back plate 6 is supported at its lower edge upon the semicircular rib 7, said rib being notched at 7' to receive it, as shown in Figs. 6 and 1, and the opening 5 extends inside the teeth of the distributing-wheels, so as to allow the surface of the wheel to carry a portion of the fertilizer material through the opening. A pivoted hammer 11, formed with an inclined under face, is operated by the teeth 3 of the wheel 2 in such manner that the discharge of the fertilizer through the orifice 8 is rendered more certain. The teeth on the wheels are of less thickness than the body portion and are approximately in line with its upper surface, leaving a space between the bottom of the fingers and the upper side of the bottom plates 10. It has been found that when the fingers are made in the above form more fertilizer is carried through the orifice 8 than should be, particularly if the fertilizer be lumpy, it being found that more or less of the fertilizer will adhere to the bottom of the teeth and to the peripheral spaces between the teeth.

To cure the above evil and to provide a better distribution of the fertilizer, I have placed a raised portion 12, having a thickness equal to the space between the lower surface of the teeth and the upper surface of the plate 10 and located on the plate back of the feed-orifice 8, as shown in Fig. 6, the object of the raised portion being to clean the lower surface of the teeth and prevent the adhering material carrying along other portions to the discharge-orifice 8.

The semicircular rib 7 extends slightly above the distributer-wheel. Along the back of the hopper 1 is arranged a rod 13, adapted to be moved longitudinally and being supported by suitable bearings 14, secured to the side of the hopper. Upon this rod are pivotally mounted a series of gates 15, that are held from lateral movement thereon by means of pins through the rod, as shown in Fig. 3. The gates have a special form and rest upon the distributer-wheels when in action, as shown in Fig. 2. The gates are designed to act as deflectors for the fertilizing material and to regulate the size of the discharge-openings 5 in the back plates 6 by being adjusted longitudinally along the rear side of the plates. As shown in Fig. 6, the gate rests upon the wheel, and while its outer surface is inclined upward and rearward to conform with the angle of the back plate and operates close to it, as shown in Fig. 1, its under surface is triangular in form, having its rear edge disposed at an angle with its face for the purpose of deflecting the fertilizing material off from the surface of the distributer-wheel and toward the discharge-orifice 8, as shown in Fig. 6.

The means provided for moving the rod 13 and the gates 15 longitudinally comprise the lever 16, having the crank portion 17, suitably connected with the end of the rod 13, the horizontal portion 18, supported in bearings at the end of the hopper and having the lever-handle 19, that is provided with an index-finger, which in combination with the dial-plate 20 indicates the position of the gates to allow the distributer devices to discharge any predetermined quantity within their range.

The means provided for driving the distributer-wheels comprise the axle 21, upon which the carrying-wheels (not shown) are suitably mounted, and the axle is caused to revolve thereby by means of any of the usual forms of ratchet-and-pawl mechanism. Secured to the axle 21 is a pinion 22, and loosely mounted thereon is a clutch member 22', having oppositely-disposed arms 23 and 24, and mounted upon said arms are the pinions 25 and 26. The mechanism would be operative if only one arm and one pinion be used; but I prefer using two, as a better balancing of the mechanism is obtained. Surrounding these parts is a casing 27, fixed against rotation by being connected to a fixed portion of the machine. The casing is provided with gear-teeth on the inner side of its rim, with which the pinions 25 and 26 engage. The pinions are also in mesh with the pinion 22, secured to the axle. A second clutch member 28 is secured to the axle, and between this last-mentioned member and the clutch member 22 there is mounted a third clutch member 29, which is adapted to slide longitudinally upon the axle 21 and is provided with a sprocket-wheel 30, which is integral therewith. A shaft 31 is suitably journaled beneath the hopper 1 and has mounted thereon a series of bevel-pinions 32, meshing with a series 33, suitably journaled and with which the distributer-wheels are connected. A sprocket-wheel 34 is mounted upon the shaft 31 and is adapted to be clutched or unclutched therewith in a well-known manner. A driving-chain 35 passes around the sprocket-wheels. Means are provided for moving the clutch member 29 into engagement with either the member 28 or the member 22', or it may be held in a neutral position. The means comprises the fork 36, embracing the sprocket-wheel 30 and having the lever 37 attached thereto, which extends rearward and is connected with a common form of sector-rack 38.

The mechanism operates in the following manner: With the clutch member 29 engaged with the clutch member 28 the sprocket-wheel 30 is driven by the same at equal speed. If it be desired to give the sprocket-wheel a slower speed, the clutch member 29 is caused to engage with the member 22', which, carrying the pinions 25 and 26 on the arms 23 and 24, the pinions meshing with the teeth upon the casing 27 and also with the pinion secured to the axle, the clutch member 22' is given a speed proportionate with the number of teeth upon the fixed rim and the pinion 22, secured to the axle, the gearing comprising a form of what is commonly called the "planetary system."

What I claim, and desire to secure by Letters Patent, is—

1. In a fertilizer-distributer, the combination of a hopper, a distributer-wheel mounted to turn therein, a back plate projecting across a portion of the distributer-wheel, said back plate provided with a feed-opening, a gate located in rear of the back plate, and means for moving said gate longitudinally across the feed-opening in the back plate.

2. In a fertilizer-distributer, the combination of a hopper, a distributer-wheel mounted to turn therein, a back plate projecting across a portion of the distributer-wheel, said back plate provided with a feed-opening, a shaft mounted in the hopper, means for moving said shaft longitudinally, a gate pivotally secured to the shaft and moving therewith across the feed-opening in the back plate.

3. In a fertilizer-distributer, the combination of a hopper, a distributer-wheel mounted to turn therein, a back plate projecting across a portion of the distributer-wheel, said back plate provided with a feed-opening, a gate located in rear of the back plate, said gate provided with an angularly-disposed wing operating to deflect the fertilizer material off the upper surface of the wheel, and means for moving said gate longitudinally across the feed-opening in the back plate.

4. In a fertilizer-distributer, the combination of a hopper, a distributer-wheel mounted to turn therein, a back plate projecting across a portion of the distributer-wheel, said back plate provided with a feed-opening, a shaft mounted in the hopper, means for moving said shaft longitudinally, a gate pivotally secured to the shaft and moving therewith across the feed-opening in the back plate, said gate provided with an angularly-disposed wing operating to deflect the fertilizer material off the upper surface of the wheel.

5. In a fertilizer-distributer, the combination of a hopper, a distributer-wheel mounted to turn therein, a back plate projecting across a portion of the distributer-wheel, said back plate provided with a feed-opening, a shaft mounted in the hopper, means for moving said shaft longitudinally, a gate pivotally secured to the shaft and moving therewith in rear of the back plate across the feed-opening therein.

6. In a fertilizer-distributer, the combination of a hopper, a distributer-wheel mounted to turn therein, a back plate projecting across a portion of the distributer-wheel, said back plate provided with a feed-opening, a shaft mounted in the hopper, means for moving said shaft longitudinally, a gate pivotally secured to said shaft in a manner to be moved therewith, said gate operating to regulate the size of the feed-opening in the back plate from the rear thereof, and provided with an angularly-disposed wing operating to deflect the fertilizer material off the upper surface of the distributer-wheel.

7. In a fertilizer-distributer, the combination of a hopper, a series of plates forming the bottom thereof, a feed-opening in each plate, a series of toothed distributer-wheels mounted to turn upon the plates, a longitudinally-movable rod suitably supported above the wheels, means for moving the rod longitudinally, a series of deflectors pivotally mounted upon said rod in a manner to be moved with it, said deflectors arranged to deflect the fertilizer off the upper surface of the wheels toward the feed-openings in the plates.

8. In a fertilizer-distributer, the combination of a hopper, a distributer-wheel having teeth upon its periphery mounted to turn therein above the hopper-bottom, said teeth being less in thickness than the body portion of said wheel, a feed-orifice in the hopper-bottom within the path of the teeth, and a clearing device in rear of the orifice operating to clean the lower surface of the teeth.

9. In a fertilizer-distributer, the combination of a hopper, a distributer-wheel having teeth upon its periphery mounted therein, a feed-orifice in the bottom of said hopper, said bottom being arranged to be out of contact with the teeth of the distributer-wheel at all points excepting a portion in rear of and near the feed-orifice.

10. In a fertilizer-distributer, the combination of a hopper, a series of plates in the bottom of said hopper, distributer-wheels having teeth upon their peripheries and mounted to turn upon said plates, a feed-orifice in said plates, a raised portion on said plates in rear of the feed-orifices adapted to clean the lower surface of the teeth of the distributer-wheels.

11. In a fertilizer-distributer, the combination of a hopper, a bottom plate having a feed-orifice, a distributer-wheel mounted to turn upon the plate, and provided with teeth upon its periphery, the body portion of the wheel having a greater thickness than the teeth, said teeth adapted to pass above the feed-orifice, and a boss upon the plate in rear of the feed-orifice adapted to clean the lower surface of the teeth.

In witness whereof I hereto affix my signature in presence of two witnesses.

EDSON J. CORSER.

Witnesses:
LUD-HOLLAND-LETZ,
H. C. BUFFINGTON.